Feb. 4, 1969

D. W. SIMPSON 3,426,111

METHOD AND APPARATUS FOR THE PRODUCTION
OF FOAM PLASTIC SHEET

Filed Oct. 19, 1964

INVENTOR.
Donald W. Simpson
BY
AGENT
ATTORNEY

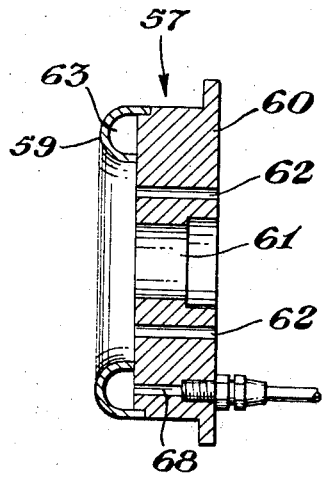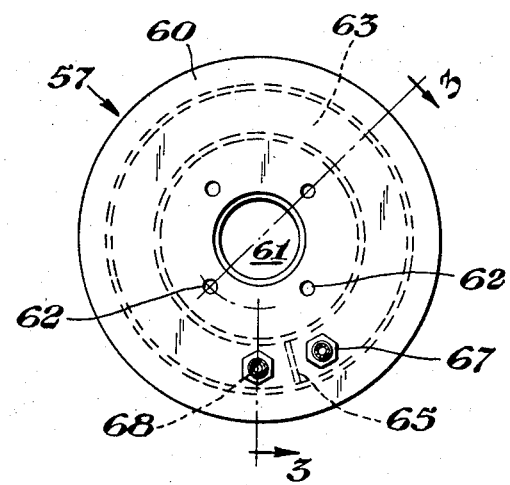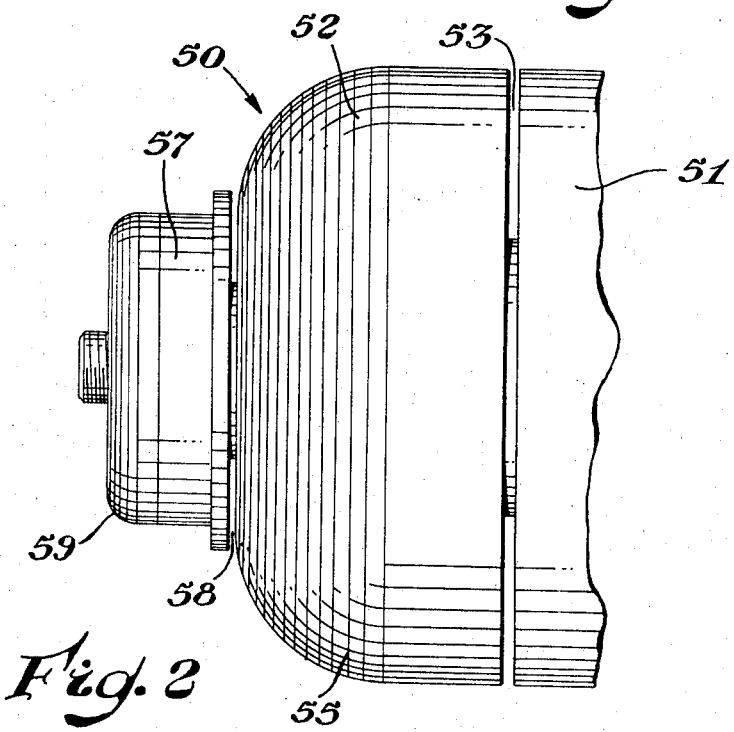

United States Patent Office 3,426,111
Patented Feb. 4, 1969

3,426,111
METHOD AND APPARATUS FOR THE PRODUCTION OF FOAM PLASTIC SHEET
Donald W. Simpson, Auburn, Mich., assignor to The Dow Chemical Company, Midland, Mich., a corporation of Delaware
Filed Oct. 19, 1964, Ser. No. 404,715
U.S. Cl. 264—48     16 Claims
Int. Cl. B29d 27/02

ABSTRACT OF THE DISCLOSURE

Improved thermoplastic resinous sheet is prepared by extruding a foamed tube, stretching the tube over a mandrel and contacting the extruded tube adjacent the die prior to stretching over the mandrel with annular cooled surfaces.

---

This invention relates to a method and an apparatus for the production of foam thermoplastic resinous sheet. It more particularly relates to a method and an apparatus for the preparation of foam thermoplastic sheet which is extruded in a tubular form and has improved surface characteristics.

Various techniques and modifications of the bubble process are used for the production of foam thermoplastic resinous sheet. However, as the thickness of the sheet is increased from thin sheet, that is, 5–10 mil in thickness and particularly sheet from 20 mils to 250 mils in thickness, control of uniformity of thickness and even geometry of the resultant product becomes increasingly difficult. To successfully produce a thick sheet of foamed thermoplastic resinous material, that is, a sheet having a thickness of from about 20–250 mils, in tubular form a heat plastified thermoplastic resinous expandable composition is expanded in the form of a tube and stretched over a generally cylindrical mandrel to obtain the desired product. In such stretching operations, beneficially gas pressure is applied to a space between the die and the mandrel and a continuous supply of gas provides lubrication and cooling for the sheet as it is drawn over the mandrel and the tubular sheet material is split and flattened. For many applications, it is extremely desirable that the foam sheet have on at least one side a glossy appearance, particularly where the sheet is to be thermoformed into food packaging trays. Oftentimes in the cooling of the internal surface of the extruded tube by air contacting the freshly extruded surface prior to a significant amount of stretching a smooth surface is produced. However on stretching, fracture of the surface occurs and an unattractive, unacceptable product results. It is also desirable to have some degree of control of the thickness of an unfoamed layer on the surface thereof.

It is an object of this invention to provide an improved method and apparatus for the preparation of foamed thermoplastic resinous sheet.

Another object of this invention is to provide a modified apparatus for the preparation of thermoplastic resinous sheet capable of preparing sheet having a smooth somewhat glossy surface.

A further object of the invention is to provide an improved method and apparatus for the preparation of thick thermoplastic resinous sheet.

These benefits and other advantages in accordance with the present invention are achieved in an apparatus for the preparation of foamed thermoplastic resinous sheet comprising in cooperative combination an extrusion apparatus so constructed and arranged so as to provide a heat plastified expanded thermoplastic resinous tube, a generally cylindrical mandrel adjacent and generally coaxially arranged with respect to an extrusion orifice, the mandrel having a diameter of at least twice the diameter of the extrusion orifice, the apparatus so constructed and arranged so as to permit the passage of gas into a space between the extruder die and the mandrel and enclosed by a foamed tube issuing from the extrusion apparatus, the improvement which comprises at least one generally annular surface adapted to circumferentially contact a surface of the extruded tube at a location adjacent the die, the annular surface being adapted to be maintained at a temperature of from about 0° to 40° centigrade, the surface having a diameter of from about 1.1 to 2 diameters of the extrusion orifice.

Also contemplated within the scope of the present invention is an improved method for the preparation of a foamed thermoplastic resinous sheet wherein a foamable expandable thermoplastic resinous composition is extruded into a region of lower pressure wherein the sheet foams to form a body containing a multiplicity of closed cells, the improvement which comprises contacting the surface of the heat plastified thermoplastic resinous foam with a surface having a temperature below the heat plastifying temperature of the extruded composition prior to further processing.

Further features and advantages in accordance with the present invention will become more apparent from the following specification when taken in connection with the drawing wherein:

FIGURES 2, 3 and 4 are various views of one embodiment of a mandrel in accordance with the invention.

Figure 1:
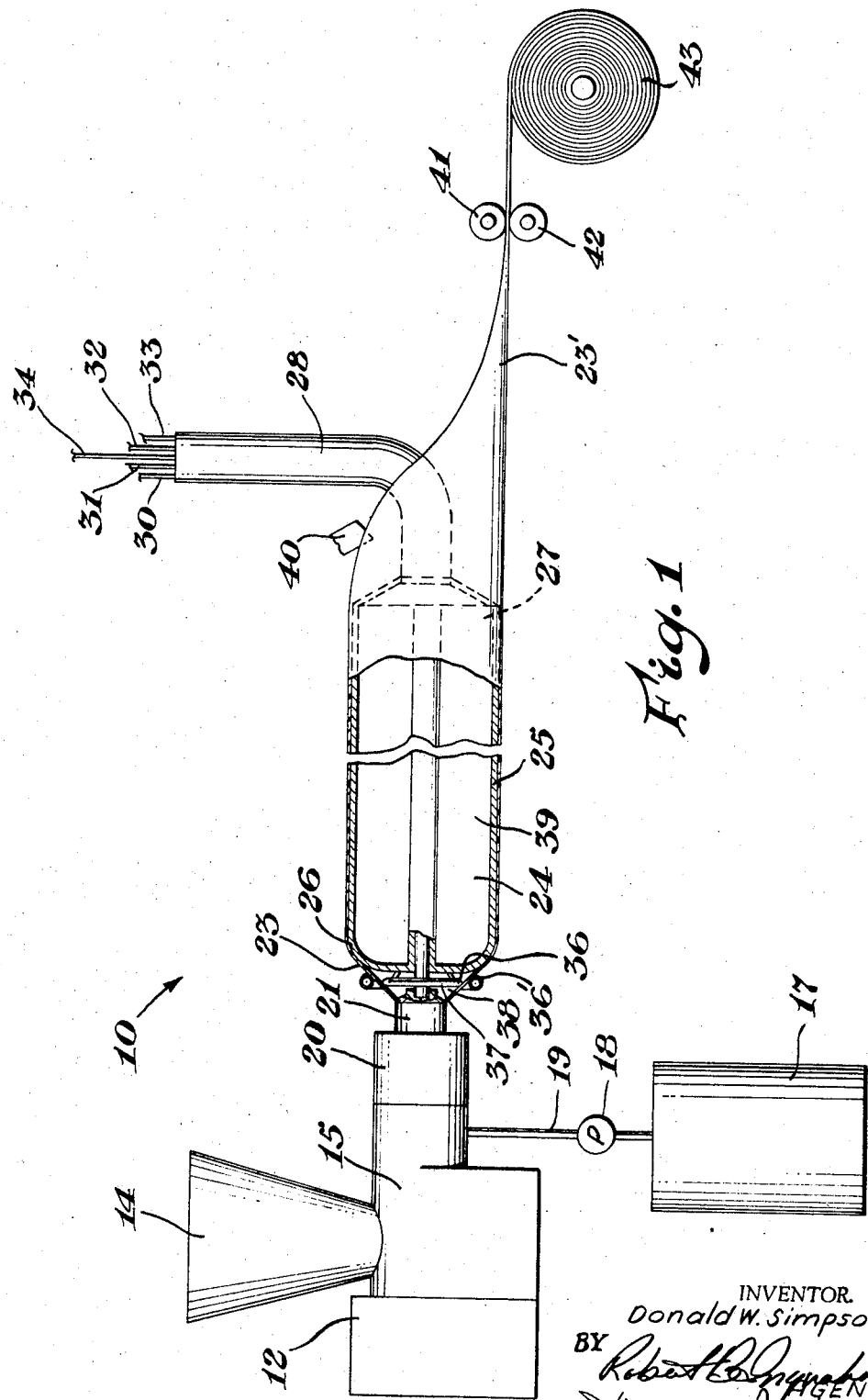
FIGURE 1 is a schematic illustration of a process employing the apparatus of the invention.

In FIGURE 1, there is illustrated an apparatus generally designated by the reference numeral 10 for the preparation of foamed thermoplastic resinous sheet having a thickness of from about 20 to about 250 mils. The apparatus 10 comprises in cooperative combination an extruder 12. The extruder 12 comprises a resin source 14, a barrel 15 containing an extruder screw, not shown, a volatile raising agent supply 17, a pump 18 disposed in a conduit 19, the pump 18 adapted to forward the volatile raising agent through the conduit 19 from the source 14 into the barrel 15 wherein it is admixed with the thermoplastic resinous material in a heat-plastified condition. A mixer-cooler section 20 is a portion of the extruder 12 wherein the volatile raising agent is admixed with the heat-plastified thermoplastic resinous material and brought to a suitable temperature for extrusion into expandable sheet. An annular die 21 is in cooperative combination with the mixer-cooler section 20 and so constructed and arranged so as to provide a tube 23 of heat-plastified expanded thermoplastic resinous material. Generally adjacent to and coaxially arranged with the extrusion orifice of the die 21 is a shaping mandrel 24. The mandrel 24 comprises a temperature control body portion 25. The mandrel 24 has a first end 26 and a second end 27. The first end 26 is disposed generally adjacent the extrusion die 21 and the second end 27 is disposed remotely from the die 21. The mandrel 24 is maintained in position by a mandrel support 28. The mandrel support 28 has disposed therein fluid conduits 30, 31, 32, 44 and 34. A generally annular ring 36 is affixed to the first end 26 of the mandrel 24. The annular ring 36 defines a generally annular surface 37. The ring 36 is in operative communication with the conduits 31 and 32 which are in communication with a source of cooling fluid having a temperature of from about 0° to 40° C. The body 25 defines an internal cavity 39 which is in operative communication with the conduits 32 and 33 which, in turn, are operatively connected to a temperature controlled fluid source. The conduit 34 extends through the mandrel support 28 and terminates generally adjacent the ring 36 and is adapted to supply a gas under pressure to an annular space designated by the reference numeral 38.

A second annular cooling ring 36' is disposed adjacent the die 21 and is coaxially arranged with respect to the die 21 and the mandrel 24. A slitting means 40 is disposed generally adjacent the body 25 of the mandrel 24 and so constructed and arranged so as to axially slit the extruded tube 23 to form sheet 23'. A pair of draw rolls 41 and 42 are disposed generally adjacent the second end 27 of the mandrel 24 and adapted to draw the sheet 23' from the die 21. The sheet 23' is wound onto a roll 43.

In operation of the apparatus as illustrated in FIGURE 1, thermoplastic resinous material from the supply 14 is heat plastified within the extruder 12, mixed with a volatile raising agent within the barrel 15, is further mixed and brought to temperature within the mixer-cooler 20 and is extruded from the die 21 into a tube 23 which is stretched over the mandrel 24 in such a manner that the internal surface of the tube 23 contacts the chilled annular surface of ring 37 and the annular surface of the ring 36 before it is stretched to its final diameter. The mandrel 24 serves to cool the tube 23 below the thermoplastic temperature whereupon it is slit and formed into a flat sheet. A gas such as air is supplied through a conduit 34 into the annular space between the chilled annular surface 37 and the body 25 of the mandrel 24. The gas is then discharged along the surface of the mandrel moving from the first end 26 to the second end 27 providing gas lubrication and substantially and significantly reducing friction between the foamed tube 23 and the external surface of the mandrel 24. Beneficially, the gas serves also to cool the foamed thermoplastic resinous material.

In FIGURE 2, there is illustrated a view of a portion of a mandrel in accordance with the invention generally designated by the reference numeral 50. The mandrel 50 comprises a main body portion 51 and a head portion 52 maintained in spaced coaxial relationship with the body portion 51 providing a generally annular space 53 between the head portion 52 and the body portion 51. The head portion 52 defines a stretching surface 55 having generally circular cross-sectional configuration to form a blunt bullnose mandrel. A chill ring 57 is coaxially affixed to the head portion 52 remote from the body 51. The chill ring 57 is maintained in spaced relationship from the head portion 52 forming a generally annular space 58. The chill ring 57 defines a generally annular foam contacting surface 59 remotely disposed from the mandrel 50.

FIGURES 3 and 4 illustrate a sectional and front view, respectively, of the chill ring 57. The chill ring 57 comprises a body portion 60 defining a generally centrally disposed aperture 61, a plurality of mounting holes 62 and a generally annular cavity 63 having disposed therein a flow restricter 65, a pair of cooling fluid passages 67 and 68 disposed adjacent the fluid restricter, the passages being so constructed and arranged so as to induce flow of a cooling fluid from a passage such as the passage 68 generally through the cavity 63 and out of the passage 67 to provide a substantially uniform temperature control of the surface 59. Beneficially, a lubricating gas such as air is provided to the space 58 to minimize the contact of the surface of the foamed sheet with the surface 55 of the mandrel head 52. Advantageously, additional cooling air is provided through the space 53 under sufficient pressure to cause an increased volume of air to flow along the surface of the mandrel 51.

Apparatus generally as shown in FIGURE 1, was employed to extrude a mixture of 97 parts of polystyrene containing 3 parts of an copolymer of 67 weight percent styrene and 33 weight percent maleic anhydride and about 5 parts by weight of n-pentane for this purpose a 2½ inch National Rubber Machinery extruder is fitted with a blowing agent inlet positioned about 25 inches from the terminal portion of the screw. Following the heat-plastifying section of the extruder is a cooling section which is fitted with a film die having an annular orifice of about 4 inches in diameter and an opening of about 0.20 inch wide. A chill ring substantially in accordance with that shown in FIGURES 2, 3 and 4 is employed having a diameter of about 5¼ inches the external chill ring having an internal diameter of 6". Both rings were maintained at a temperature of about 20° C. by means of circulating water. The mandrel diameter was 14 inches. Material was extruded at a rate of about 60 pounds per hour. The temperature of the extrusion die and mixer-cooler section was maintained at about 143° C. and a foam sheet having a thickness of 78 mils was prepared. The heat-plastified foamed tube contacted the chill rings at a distance of about 4 inches from the die. The tube was drawn over the mandrel and stretched to the desired degree. The interior surface of the extruded sheet, that is, the surface contacting and generally adjacent the mandrel head, has an exceptionally smooth and a lustrous appearance.

By way of contrast, a sheet prepared under identical conditions with the exception of the removal of the external chill ring indicated a rough, unattractive surface. Similar results are obtained when the external and internal chill rings are removed. Substitution of an air blast from an annular ring on the surface of the tube resulted in a foamed sheet having a surface which had smooth portions separated by rough portions and having the general appearance of mud cracks. In a similar manner, various foamed plastic materials, particularly those such as a copolymer of 90 parts styrene and 10 parts methyl methacrylate, a copolymer of 70 parts styrene and 30 parts methyl methacrylate and a mixture of 90 parts polystyrene and 10 parts diene rubber are beneficially extruded employing the apparatus of the present invention to provide a foam sheet having an exceptionally attractive surface.

By way of further illustration employing an apparatus generally as illustrated in FIGURE 1, polystyrene granules whose 10 percent by weight solution in toluene at 25° centigrade was 39 centipoise were fed to a 4½ inch extruder at a rate of 300 pounds per hour. The polystyrene granules prior to entering the extruder were admixed with granules of a styrene maleic anhydride copolymer containing copolymerized therein 70 parts by weight of styrene and 30 parts by weight of maleic anhydride at a rate of 9 pounds per hour. The extruder is operated at an internal pressure of 30,000 pounds per square inch. n-Pentane is injected into the barrel of the extruder at a rate of 18 pounds per hour at a distance of about 60 inches from the feed port. The heat plastified polystyrene composition containing the pentane leaves the extruder at a temperature of about 235° centigrade and is passed to a rotary cooler such as the cooler 22 of FIGURE 1 wherein the heat plastified mixture is mechanically worked and uniformly cooled to a temperature of about 120° centigrade. The cooling section utilizes a liquid cooled jacket and a liquid cooled screw. The heat plastified polystyrene composition is extruded through an annular die orifice having an outside diameter of about 3 inches and a width of about 0.040 inch. The rotation of the screw in the rotary cooler is adjusted to provide a pressure drop of about 1,000 pounds per square inch across the die. Adjacent the die are a pair of chill rings fabricated from 0.5 inch diameter stainless steel tubing and maintained at a temperature of about 20° centigrade by means of internally circulating water. The internal chill ring had an outside diameter of 3½ inches and was spaced about ¾ of an inch from the extrusion orifice, the external chill ring had an inside diameter of about 3¾ inches and was spaced about 1 inch from the extrusion orifice. The extruded tube was dawn over a 10 inch diameter forming mandrel having a length of about 60 inches. The forming mandrel was maintained at a temperature of about 60° centigrade and air under pressure injected into the space between the forming mandrel and the die to provide a current of air passing over the external surface of the mandrel and adjacent the inner surface of the foamed tube. The foamed tube was split by means of a knife and flattened over a distance of about 20 feet. The resultant sheet was about 0.060 inch in thickness at a density of about 7 pounds per cubic foot and was wound onto a roll at a rate of about 60 feet per minute. The sheet was substantially uniform in thickness and had fine cells. Both sides of the sheet had an attractive, smooth glossy appearance.

Repetition of the foregoing illustration utilizing higher feed rates results in the formation of uniform thickness sheets having thicknesses up to about ¼ of an inch and by employing lower feed rates, uniform thickness sheets having thicknesses of about 0.020 inch are readily formed.

In a manner generally similar to the foregoing illustration foam sheets are readily prepared employing polystyrene having solution viscosities of 20 and 200 centipoise. Similar beneficial and advantageous results are also obtained when the hereinbefore delineated polymers, nucleating agents, and blowing agents are employed in accordance with the practice of the invention. It must be realized that for each particular combination, optimum processing conditions vary slightly.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An improved method for the preparation of a foamed thermoplastic resinous sheet wherein a foamable thermoplastic resinous composition is extruded through an annular extrusion orifice into a region of lower pressure wherein the sheet foams to form a tubular body containing a multiplicity of closed cells, the tube having an inner surface and an outer surface, stretching the tubular body over a mandrel and slitting the body to form a sheet, the improvement which comprises contacting at least one of the surfaces of the heat plastified thermoplastic resinous foam with a cooling means defining an annular cooling surface having a temperature below the heat plastifying temperature of the extruded composition prior to stretching over the mandrel.

2. The method of claim 1 wherein the thermoplastic resinout sheet in a heat plastified condition is cooled by passing over a polished metal annular surface having a fluid circulating therein having a temperature of from about 0–40° centigrade.

3. The method of claim 1 wherein the expandable thermoplastic resinous composition is an alkenyl aromatic resinous material.

4. The method of claim 3 wherein the alkenyl aromatic resinous material is predominantly polystyrene.

5. The method of claim 4 wherein the expandable polystyrene composition contains n-pentane as a raising agent.

6. The method of claim 1 wherein the cooling means defining the annular cooling surface has a diameter of from about 1.1 to about 2 times the diameter of the extrusion orifice.

7. The method of claim 1 wherein the inner surface of the tubular body contacts the cooling surface.

8. The method of claim 1 wherein the outer surface of the tubular body contacts the cooling surface.

9. The method of claim 1 wherein the inner and outer surfaces of the tubular body are contacted by a cooling surface.

10. In an apparatus for the preparation of foamed thermoplastic resinous sheet comprising in cooperative combination an extrusion apparatus defining an annular extrusion orifice so as to provide a heat-plastified expanded thermoplastic resinous tube, a generally cylindrical mandrel having a rounded forward edge adjacent and generally coaxially arranged with respect to the extrusion orifice, the mandrel having a diameter of at least twice the diameter of the extrusion orifice, the mandrel arranged so as to permit the passage of gas into a space between the extrusion die and the mandrel and enclosed by a foamed tube issuing from the extrusion apparatus, the improvement which comprises an annular ring having a generally annular surface disposed between the mandrel and the die adapted to contact a surface of the extruded tube at a location adjacent the die, the annular surface being adapted to be maintained at a temperature of from about 0 to 40° C., the ring having a diameter of from about 1.1 to 2 diameters of the extrusion orifice.

11. The apparatus of claim 1 wherein the annular surface is the surface of a liquid conduit.

12. The apparatus of claim 11 wherein the surface has a generally circular cross-sectional configuration.

13. The apparatus of claim 1 including means to apply a gas to the space between the annular surface and the mandrel.

14. The apparatus of claim 1 wherein the annular surface is an external annular surface adapted to engage an inner surface of the extruded tube.

15. The apparatus of claim 1 wherein the annular surface is an internal annular surface adapted to engage an external surface of the tube.

16. The apparatus of claim 1 wherein the annular surface is an external annular surface adapted to engage the internal surface of the tube in cooperative combination with means defining the second annular surface which is an internal annular surface and adapted to engage the external surface of the tube.

References Cited

UNITED STATES PATENTS

| 2,720,680 | 10/1955 | Gerow | 18—14 |
| 2,757,153 | 7/1956 | Bowen | 260—29.6 |
| 2,893,877 | 7/1959 | Nickolls | 264—321 XR |
| 2,987,765 | 6/1961 | Cichelli | 264—95 |
| 2,987,767 | 6/1961 | Berry et al. | 264—95 |
| 3,290,198 | 12/1966 | Lux et al. | 264—51 |
| 3,299,192 | 1/1967 | Lux | 264—53 |
| 3,311,681 | 3/1967 | Cherney et al. | 264—53 |

FOREIGN PATENTS 854,586  11/1960  Great Britain.

OTHER REFERENCES

Vern Gliniecki: "Equipment Needed for the Extrusion of Expandable Polyestyrene Beads." Plastics Design and Processing, September 1964.

Koppers Technical Manual Dylite Expandable Polystyrene. "Extrusion of Dylite Expandable Polystyrene." Bulletin C–9–273, Chapter 4a, Apr. 24, 1962, pp. 12–15.

JULIUS FROME, Primary Examiner.

PHILIP E. ANDERSON, Assistant Examiner.

U.S. Cl. X.R.

18—5, 14; 264—51.95

UNITED STATES PATENT OFFICE
CERTIFICATE OF CORRECTION

Patent No. 3,426,111　　　　　　　　　　　　　　　February 4, 1969

Donald W. Simpson

It is certified that error appears in the above identified patent and that said Letters Patent are hereby corrected as shown below:

Column 2, line 60, "44" should read -- 33 --. Column 4, line 40, "30,000" should read -- 3,000 --. Column 6, lines 19, 23, 26, 29 and 32, the claim reference numeral "1", each occurrence, should read -- 10 --.

Signed and sealed this 31st day of March 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents